Jan. 1, 1957 R. O. BRADLEY 2,776,103
BATCHING SCALE CONTROL CIRCUIT
Filed May 10, 1952 2 Sheets-Sheet 1
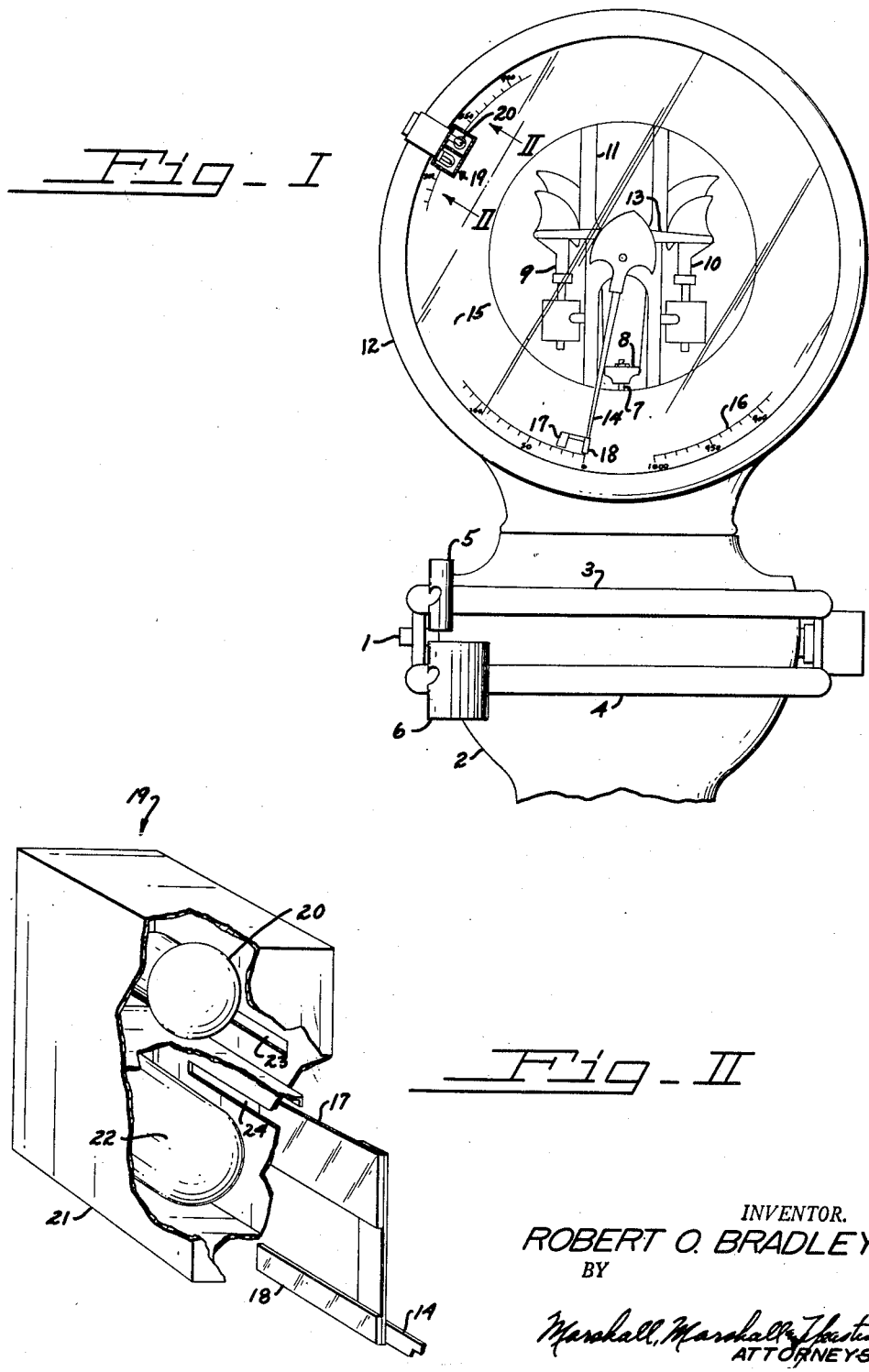
Fig. I
Fig. II
INVENTOR.
ROBERT O. BRADLEY
BY
Marshall, Marshall & Jasting
ATTORNEYS

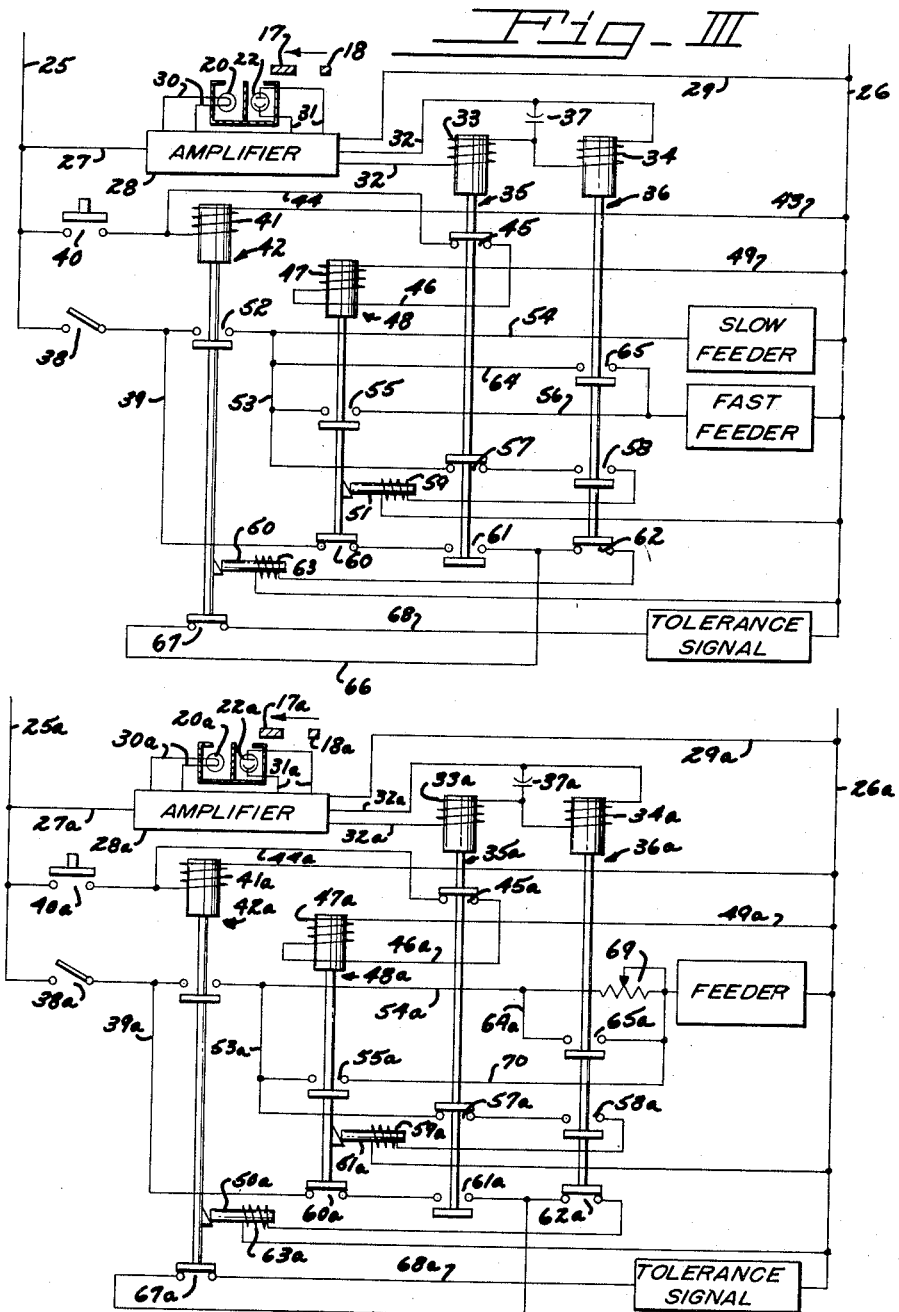

United States Patent Office 2,776,103
Patented Jan. 1, 1957

2,776,103

BATCHING SCALE CONTROL CIRCUIT

Robert O. Bradley, Toledo, Ohio, assignor to Toledo Scale Company, Toledo, Ohio, a corporation of Ohio Application May 10, 1952, Serial No. 287,218

6 Claims. (Cl. 249—2)

This invention relates to weighing scales and in particular to an improved circuit for operating and controlling the action of feeders arranged to automatically feed material onto a weighing scale in the preparation of batches of predetermined weight.

In the feeding of material onto a weighing scale it is customary to arrange the control in a manner such that the major portion of the load is fed onto the scale at a relatively rapid rate and that the last few percent of the load are fed onto the scale at a relatively slow rate known as a dribble feed so that an accurate cutoff at the desired net weight may be obtained. This type of control suffers from the disadvantage that occasionally the change from fast feed to slow or dribble feed is so abrupt that the weighing scale indicator undergoes a slight oscillation which occasionally results in enough reverse movement to trip the control a second time and thus give a false final cutoff signal.

The principal object of this invention is to provide a cutoff control system which is not subject to false operation when subjected to abrupt changes in the rate of feed of material onto the scale.

Another object of the invention is to provide a system of latch relays arranged so that a feeding cycle that is interrupted by a power failure will be automatically completed when the power failure is corrected.

A still further object of the invention is to provide a feeder control circuit in which the change from fast feed to slow feed is delayed an appreciable time interval after the cutoff signal is received from the sensing mechanism.

An ancillary object of the invention is to provide an auxiliary circuit to give a signal as soon as the feeding cycle is completed and as long as the indicator of the weighing scale indicates that the correct weight of material is on the scale.

Further objects and advantages may be obtained from a cutoff circuit arranged according to the invention.

According to the invention the improved material feeding control system includes a pair of latch relays arranged to control material feeders and means in the sensing mechanism of the cutoff circuit for providing a pulse signal through a first circuit when a signal from the sensing means starts and a second pulse signal through a second circuit when the signal stops. The sensing mechanism includes means for generating a signal during the next to the last increment of approach toward the correct net weight, for cutting off the signal during the last increment of approach and for again generating a signal when the correct net weight is reached. Such a signal may be produced by a two-bladed light interceptor or mirrors cooperating with a photoelectric cell or by a plurality of spaced apart magnets on an indicator cooperating with a mercury magnetic switch.

A preferred embodiment of the invention is illustrated in the accompanying drawings.

In the drawings:

Figure I is a front elevation, with parts broken away, showing the indicating and load counterbalancing mechanism of a weighing scale equipped with a photoelectric cell and mirrors arranged according to the invention.

Figure II is an enlarged, fragmentary, partially broken away, isometric view of the photoelectric cell and light source in its housing and the cooperating portions of a weighing scale indicator.

Figure III is a schematic wiring diagram showing the control circuits arranged according to the invention.

Figure IV is a similar diagram and differs from Figure III only in the showing of a single two-speed feeder instead of the two feeders shown in Figure III.

These specific figures and the accompanying description are intended to merely illustrate the invention and not to impose limitations on its scope.

The improved control system is intended to be used with any type of batching weighing scales where it is desired to automatically feed material into a receptacle supported by the scale and to automaticaly cut off the feeding of material when the desired net weight is reached. Since the feeding equipment and the weighing scale structure itself are well known only the indicating portion of the weighing scale and the control circuits are shown in the drawings. Referring to Figure I, forces from loads applied to a load receiver of a weighing scale are transmitted through a conventional lever system (not shown) that is operatively connected to a lever 1 pivotally mounted in an enlarged section 2 of a column of the weighing scale. The lever 1 includes a pair of beams 3 and 4 carrying poises 5 and 6 respectively adapted to counterbalance the weight of a receptacle placed on the scale. The lever 1 is furthermore connected through a steelyard rod 7 and cross head 8 to a pair of pendulums 9 and 10 that are mounted on a guide 11 in a substantially watchcase-shaped housing 12 surmounting the column of the scale.

The pendulums 9 and 10 are operatively connected through a compensating bar 13 and a rack and pinion drive to an indicator 14 that is arranged to sweep over an annular chart 15 and cooperate with indicia 16 to indicate the magnitude of the load being counterbalanced.

The indicator 14, near its tip, is provided with a pair of mirrors 17 and 18 arranged to cooperate with a photoelectric cell assembly 19 that is clamped to the rim of the housing 12 when the load on the scale approaches and reaches the desired net weight.

The mirrors 17 and 18, see also Figure II, are preferably pieces of polished metal that readily reflect light to which the photoelectric cell is sensitive. The photoelectric cell assembly 19 includes a light source 20 arranged within a first compartment of a housing 21 and a photoelectric cell 22 arranged within a second compartment of the housing 21. Slits 23 and 24 cut in a side wall of the housing 21 permit light from the light source 20 to escape from the first compartment and, when a mirror is in place, to be reflected through the second slit 24 to the photoelectric cell 22.

The mirror 17 is made relatively wide while the mirror 18 is usually made quite narrow. A substantial space is left between the mirrors 17 and 18. The control circuit is arranged so that when the leading edge of the first mirror 17 enters the light beam and reflects light to the photoelectric cell 22 a signal is generated but this signal does not affect the rate of feed of material. As the indicator 14 carries the mirror 17 past the light beam the light to the photoelectric cell is cut off, the light passing between the mirrors 17 and 18, and the control then cuts off the fast feed. As the dribble continues and the indicator 14 slowly advances, the mirror 18 finally reaches the light beam from the light source 20 and reflects light to the photoelectric cell 22. In response to this signal the control immediately cuts off the slow feed of material to the weighing scale hopper. This completes the cycle of operation and the signal resulting from light reflected to the photoelectric cell by the narrow mirror 18 may cooperate with the latch relays of the control to indicate that the filling or feeding cycle has been accurately completed and that the load in the hopper is within a specified tolerance.

The electrical circuits are illustrated in Figures III and IV. Referring in particular to Figure III electric power from power lines 25 and 26 is fed through a lead 27 to an amplifier 28 and through a return lead 29 to the return power lead 26. The amplifier 28, through leads 30, energizes the light source 20. Likewise the photoelectric cell 22 is connected through leads 31 to the amplifier.

The spaced mirrors 17 and 18 of the indicator 14 are shown as they are approaching the position at which they cooperate with the light source 20 and photocell 22. An output circuit of the amplifier 28 is connected through leads 32 to energizing coils 33 and 34 of a first and a second relay 35 and 36 respectively. A condenser 37, connected in parallel with the relay coil 34, delays the operation of the relay 36 for a short time interval following the start of current flow from the amplifier and also serves to maintain current flow through the coil 34 for a short time interval following current cutoff in the amplifier.

When it is desired to use the equipment a switch 38 is closed to connect the power line 25 to a lead 39 to provide power for the material feeders and part of the control system. This switch also serves as an emergency stop because all the power for the feeders is taken from the lead 39.

A filling cycle is started by momentarily closing a push button switch 40 so that current may flow from the power line 25 through a closing coil 41 of a first latch relay 42. The latch relay closing coil 41 is connected to the return lead 26 through a lead 43. Also, if the photoelectric cell amplifier 28 is not energized the closure of the push button switch 40 also permits current to flow through a lead 44, now closed contacts 45 of the first relay 35, a lead 46, a closing coil 47 of a second latch relay 48 and a lead 49 connected to the return lead 26. Current flow through the closing coils 41 and 47 closes the latch relays 42 and 48 and they are held in closed position by latches 50 and 51 respectively.

The closure of the first latch relay 42, by closing its contacts 52, energizes a lead 53 and a branch lead 54 that feeds current to a slow-speed feeder arranged to feed material into the hopper at a slow rate.

At the same time, if the second latch relay 48 is also closed, current flows through contacts 55 and a lead 56 to a high-speed or fast feeder so that that feeder also operates to speed up the filling operation.

As long as both latch relays are closed and power is supplied through the switch 38 both feeders operate to feed material onto the scale and the resulting increase in weight is continuously indicated by the indicator 14 (Figure I). When the indicator reaches a position at which the leading edge of the leading mirror 17 reflects light into the photoelectric cell 22 the amplifier 28 passes current through its output circuit to immediately operate the first relay 35 and a moment later operate the second relay 36. The operation of the second relay 36 is delayed by the condenser 37. No action takes place in the control circuit at this time because contacts 57 of the first relay 35 open before contacts 58 of the second relay 36 closes. Therefore, no current may flow from the lead 53 to a release coil 59 of the second latch relay 48. Likewise, no current can flow through the circuit from the lead 39 through contacts 60 of the latch relay 48, contacts 61 of the first relay 35 and contacts 62 of the second relay 36 which are arranged to energize a release coil 63 of a first latch relay 42 at the appropriate time. This circuit is broken at the contact 60 as long as the second latch relay 48 is held in its latched position.

As the fast feed continues and the leading mirror 17 sweeps across the light beam and leaves the beam, the current in the output circuit of the amplifier 28 is interrupted thereby first releasing or de-energizing the first relay 35 and a moment later releasing the second relay 36. This sequence momentarily completes the circuit from the lead 53 through the contacts 57 and 58 (the contacts 57 of the first relay 35 closing before the contacts 58 of the second relay open), so that current may momentarily flow through the latch release coil 59 of the second latch relay 48 thereby releasing this latch relay. The release of the latch relay 48, by opening its contacts 55, interrupts current flow through this circuit for operation of the fast feeder. However, the fast feeder continues to operate by means of current flow from the lead 53 through lead 64 and contacts 65 of the second relay 36 until the second relay releases a short time after the interruption of output current from the amplifier 28.

The operation of the fast feeder during this brief time interval while the relay 36 is releasing allows enough material to be fed into the hopper so that there is little chance, upon the abrupt interruption of the fast feed, for the weighing scale indicator 14 to oscillate far enough so that the mirror 17 backs up into the light path and gives a false signal. Likewise, the space between the mirrors 17 and 18 is made long enough so there is no chance for the indicator to overrun and bring the second or narrow mirror 18 into the light beam prematurely.

As material continues to flow into the weighing scale hopper from the slow feeder, the indicator 14 slowly advances until finally the second mirror 18 reaches the light beam and reflects light into the photoelectric cell 22. At this time the relays 35 and 36 are again successively operated, this time momentarily closing a circuit from the lead 39 through the contacts 60 of the now released latch relay 48 and contacts 61 and 62 of the first and second relays 35 and 36 so that current may flow through the latch release coil 63, thus releasing the first latch relay 42. Thereupon, its contacts 52 open to interrupt the operation of the slow feeder.

This completes the normal filling or feeding cycle of the apparatus and if desired this fact may be electrically indicated by a tolerance signal that is energized by current flowing from the lead 39 through the contacts 60 of the latch relay 48, contacts 61 of the first relay 35, a lead 66, contacts 67 of the latch relay 42, and a lead 68 to the tolerance signal. Since the contacts 61 included in this circuit are closed only as long as the photocell is energized the tolerance signal will be activated only as long as the mirror 18 remains in position to reflect light to the photocell. Therefore, the mirror 18 is made generally equal in width to the size of the tolerance zone allowed for the batch weight. In the event that an excess or deficiency occurs the mirror 18 does not remain in the light path and the relay 35 is de-energized to break the tolerance signal circuit.

Figure IV shows the same circuit modified to operate a single two speed feeder rather than the slow and fast feeders illustrated in Figure III. Rather than repeat the description of Figure III, which applies to the similar parts of Figure IV, that description may be read as applying to Figure IV by substituting similar reference numerals including a suffix "*a*" for the reference numerals appearing in Figure III.

The only difference between the two circuits is that lead 54*a* is broken and an adjustable rheostat 69 is inserted ahead of the feeder so that as long as current must flow through the rheostat 69 to reach the feeder the feeder operates at its slow speed. High speed operation of the feeder is obtained by by-passing the rheostat 69 either by means of contacts 55*a* of the latch relay 48*a* and lead 70 or by means of contacts 65*a* of the second relay 36*a*. Since in the wiring diagram, shown in Figure III, the fast feeder is operated through either of the contacts 55 or 65 and since in this circuit, shown in Figure IV, the rheostat 69 is shorted out by closing either of the contacts 55a or 65a it is readily apparent that the overall operation of the two systems is identical.

The operation of the circuit may be summarized by remembering that the photoelectric cell, as an example of a pick-up device or switch, provides a signal through the next to the last increment of a filling cycle, then interrupts that signal through the last increment of the filling cycle, and re-establishes the signal when the desired net weight is indicated. Means responsive to these signals are arranged to momentarily complete a first circuit as the signal appears and to momentarily complete a second circuit when the signal disappears. These momentarily closed circuits are used to release a first latch relay at the beginning of the last increment of the filling operation and to release the second latch relay to terminate the filling operation. As an ancillary feature the high speed feeder is operated for a moment following the release of the first latch relay to guard against any false operation that may result from oscillation of the indicator following an abrupt interruption of the fast feed. Another ancillary feature provided by the improved circuit is the provision of a tolerance signal to operate if and only if the filling cycle is completed and the correct amount of material has been deposited on the weighing scale.

Various modifications may be made in the details of the control circuits and in the particular elements of the indicator position-sensing mechanism and in the relays themselves without departing from the scope of the invention.

Having described the invention, I claim:

1. In a cutoff circuit for an automatic weighing scale having a weight indicator and feeding means, in combination, a first and a second relay that are connected for simultaneous energization, means for delaying the response of the second relay, means responsive to the indicator for energizing, then releasing, then re-energizing said relays as the indicator approaches and arrives at a preselected point, a first and a second latch relay each having a closing and a release coil, circuit means including at least a set of contacts on the first latch relay for operating the feeding means at slow speed, second circuit means energized through the contacts of said first circuit and including parallelly connected sets of contacts of the second latch relay and the second relay for operating the material feeding means at high speed, a third circuit that is energized through the set of contacts of the first circuit and that includes serially connected sets of contacts of the first and second relays and the release coil of the second latch relay, said serially connected contacts being arranged to complete said third circuit momentarily as said relays are de-energized, and a fourth circuit that includes in series sets of contacts of the second latch relay, contacts of the first and second relays and the release coil of the first latch relay, said contacts being arranged to momentarily close the circuit during energization of said relays if the second latch relay is released, and means for closing said latch relays to start a cycle of operation.

2. In a cutoff circuit for an automatic weighing scale having a weight indicator and material feeding means, in combination, a first and a second relay, means responsive to the weight indicator for energizing, de-energizing and re-energizing said relays as said weight indicator approaches and reaches a preselected position, means for delaying the response of the second relay, a first and a second latch relay each having a closing coil and a release coil, contacts on said latch relays for controlling a high speed circuit for said material feeding means when both latch relays are closed and controlling a low speed circuit for the feeding means when the first latch relay only is closed, a circuit including the release coil of the second latch relay for releasing the second of the latch relays, said circuit including in series contacts on the first relay that are closed when the relay is de-energized and contacts on the second relay that are closed when the relay is energized so that the circuit is momentarily completed when the relays are de-energized, a circuit including the release coil of the first latch relay in series with contacts of the second latch relay, contacts of the first relay that are closed when the relay is energized, and contacts of a second relay that are closed when the relay is de-energized for releasing the first latch relay when the relays are energized with the second latch relay released, and means for closing the latch relays to start a cycle of operation.

3. In a cutoff circuit for an automatic weighing scale having a weight indicator and feeding means, in combination, a first and a second relay, means co-operating with the weight indicator for successively energizing, de-energizing, and re-energizing said first and second relays as the weight indicator approaches and arrives at a preselected position, means for delaying the response of the second relay to energization and de-energization, said first relay having a first set of contacts that are closed and a second set of contacts that are open when the relay is de-energized, said second relay having a first set of contacts that are open and a second set of contacts that are closed when the relay is de-energized, a first and a second latch relay each having a closing coil and releasing coil, contacts on the latch relays to close a high speed circuit to the feeding means when both latch relays are closed and a slow speed circuit when the first latch relay only is closed, means for closing both latch relays, a circuit for the release coil of the second latch relay that includes in series the first set of contacts of the first relay and the first set of contacts of the second relay, and a release circuit for the release coil of the first latch relay that includes in series a set of contacts of the second latch relay that are closed when the relay is released, the second set of contacts of the first relay, and the second set of contacts of the second relay, whereby the first energization of the relays has no effect, the de-energization of the relays momentarily energizes the release coil of the second latch relay and the subsequent energization of the relays momentarily energizes the release coil of the first latch relay.

4. In a cutoff circut for an automatic weighing scale having a weight indicator and material feeding means, in combination, means responsive to the weighing indicator for momentarily closing a first circuit as the weight indicator approaches a preselected position and a second circuit as the mechanism reaches the selected position, a first and a second latch relay each having a closing coil and a releasing coil, the latch relays being adapted to control circuits for operating the material feeding means at high speed when both relays are closed and at slow speed when the first only is closed, means including the first circuit for energizing the release coil of the second latch relay, means including the second circuit and contacts of the second latch relay that close when the relay is released for energizing the release coil of the first latch relay, and means for closing both latch relays to start a cycle of operation.

5. A cutoff circuit according to claim 3 in which the second relay has a third set of contacts arranged in circuit with the second latch relay and adapted to maintain high speed operation of the material feeding means until said second relay is released.

6. A cutoff circuit according to claim 3 in which a signal circuit is energized through a portion of the release circuit for the first latch relay including the second contacts of the first relay and contacts of the first latch relay which contacts close when the latch relay is released.

(References on following page)

References Cited in the file of this patent

UNITED STATES PATENTS

| | | | |
|---|---|---|---|
| 1,431,948 | Hallock | Oct. 17, | 1922 |
| 1,534,724 | McDonald | Apr. 21, | 1925 |
| 2,169,465 | Hadley | Aug. 15, | 1939 |
| 2,463,469 | Sherwood | Mar. 1, | 1949 |
| 2,491,049 | Johannessen | Dec. 13, | 1949 |
| 2,550,506 | Wasson et al. | Apr. 24, | 1951 |
| 2,566,210 | Kendall | Aug. 28, | 1951 |
| 2,614,786 | Caron | Oct. 21, | 1952 |
| 2,657,354 | Van Sickle | Oct. 27, | 1953 |
| 2,658,172 | Neubauer | Nov. 3, | 1953 |
| 2,685,664 | Visconti | Aug. 3, | 1954 |
| 2,689,937 | Cuttino | Sept. 21, | 1954 |